(No Model.)

R. McGRATH.
EXPANSION BOLT.

No. 456,588.   Patented July 28, 1891.

WITNESSES:

INVENTOR
Robert McGrath
BY
HIS ATTORNEY

UNITED STATES PATENT OFFICE.

ROBERT McGRATH, OF BROOKLYN, NEW YORK.

EXPANSION-BOLT.

SPECIFICATION forming part of Letters Patent No. 456,588, dated July 28, 1891.

Application filed December 22, 1890. Serial No. 375,427. (No model.)

*To all whom it may concern:*

Be it known that I, ROBERT MCGRATH, of Brooklyn, Kings county, and State of New York, have invented a certain new and useful Improvement in Expansion-Bolts, of which the following is a specification.

The object of my improvement is to provide a simple, inexpensive, and efficient bolt for fastening together articles made of stone or like material, and in which it is impossible to form serviceable screw-threads.

My improvement consists in the combination, with a screw-bolt, of a sleeve of soft material—such as lead—made internally slightly smaller than the screw-bolt, whereby if said sleeve is inserted in a cavity or recess formed in an article of stone or like material and the screw-bolt is introduced into it the sleeve will be expanded equally throughout its length, so as to become firmly fastened in the cavity or recess, and the screw-bolt will thereby serve to fasten one part of a structure to that part containing the cavity or recess.

Figure 1:
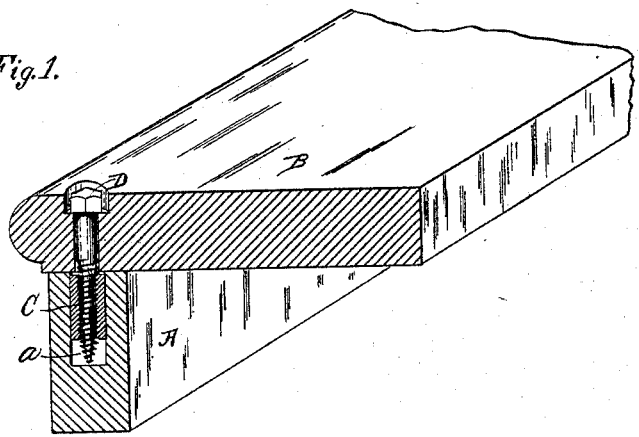
Figure 2:
Figure 3:

In the accompanying drawings, Figure 1 is a partly sectional perspective view of a stone step having its parts secured together by an expansion-bolt embodying my improvement. Fig. 2 is a side view of the screw or bolt. Fig. 3 is a longitudinal section of the sleeve.

Similar letters of reference designate corresponding parts in all the figures.

A designates the riser of a step, and B designates the tread thereof. It will be seen that in the upper part of the riser A a cavity or recess $a$ is formed. This will be cylindrical or may taper slightly outward.

C designates a sleeve of soft material, preferably lead, which, externally, is of a size which renders it capable of being easily inserted in the cavity or recess $a$, but is only slightly smaller than the same.

D designates a screw-bolt, here shown as having a shank tapering at one end and threaded throughout a considerable portion of its length. It is shown as having a polygonal head; but this is immaterial. Internally the sleeve C is somewhat smaller than the exterior of the cylindric threaded portion of the bolt D, so that if the bolt is screwed into the sleeve the latter will be expanded sufficiently to become secured within the cavity or recess $a$. It will be observed that the cylindric-threaded portion of the bolt has a height equal to the length of the sleeve, so that when the bolt is inserted the sleeve will be expanded equally throughout its length. Preferably there will be no screw-thread formed in the sleeve prior to the insertion of the screw-bolt, but a partial screw-thread may be formed.

It will be readily seen that through my improvement I provide for securely fastening articles or parts made of material in which it would be impossible to form serviceable screw-threads.

What I claim as my invention, and desire to secure by Letters Patent, is—

The combination of a bolt having a cylindric-threaded portion and a taper-threaded end, and a sleeve of lead made slightly smaller internally than the exterior of the cylindric-threaded portion of the bolt, the cylindric-threaded portion of said bolt having a length equal to the length of the sleeve, whereby said cylindric portion, when inserted, will expand the sleeve equally throughout its length, substantially as specified.

In testimony whereof I have signed my name to this specification in the presence of two subscribing witnesses.

ROBERT McGRATH.

Witnesses:
JAMES GORMAN,
THADS FORBES.